(12) United States Patent
Golab et al.

(10) Patent No.: US 9,177,343 B2
(45) Date of Patent: Nov. 3, 2015

(54) CONSERVATION DEPENDENCIES

(75) Inventors: Lukasz Golab, Morris Plains, NJ (US);
Howard Karloff, New York, NY (US);
Philip Korn, New York, NY (US);
Divesh Srivastava, Summit, NJ (US);
Barna Saha, Hyattsville, MD (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 207 days.

(21) Appl. No.: 12/927,770

(22) Filed: Nov. 23, 2010

(65) Prior Publication Data
US 2012/0130935 A1 May 24, 2012

(51) Int. Cl.
*G06N 5/02* (2006.01)
*G06Q 40/02* (2012.01)

(52) U.S. Cl.
CPC ............... *G06Q 40/025* (2013.01); *G06N 5/02* (2013.01)

(58) Field of Classification Search
CPC .............. C12Q 2537/165; G06F 19/24–19/26; G06F 2201/87–2201/88; G06F 17/30551; G06N 5/025
USPC ............................................................ 706/52
See application file for complete search history.

(56) References Cited

U.S. PATENT DOCUMENTS

| | | | | |
|---|---|---|---|---|
| 5,930,789 A * | 7/1999 | Agrawal et al. | ............... | 707/700 |
| 6,055,491 A * | 4/2000 | Biliris et al. | .................. | 702/176 |
| 6,496,817 B1 * | 12/2002 | Whang et al. | ........................ | 1/1 |
| 7,069,191 B1 * | 6/2006 | Moore | ......................... | 702/191 |
| 2004/0024773 A1 * | 2/2004 | Stoffel et al. | ................. | 707/102 |
| 2009/0076339 A1 * | 3/2009 | Quintin et al. | ................ | 600/301 |
| 2010/0017359 A1 * | 1/2010 | Kiernan et al. | ................ | 706/58 |

OTHER PUBLICATIONS

Golab et al., Sequential Dependencies, Aug. 2009, PVLDB 2(1):574-585.*

* cited by examiner

*Primary Examiner* — Kakali Chaki
*Assistant Examiner* — Michael Zidanic
(74) *Attorney, Agent, or Firm* — Scott P. Zimmerman, PLLC

(57) ABSTRACT

Given a set of data for which a conservation law is an appropriate characterization, "hold" and/or "fail" tableaux are provided for the underlying conservation law, thereby providing a conservation dependency whereby portions of the data for which the law approximately holds or fails can be discovered and summarized in a semantically meaningful way.

4 Claims, 6 Drawing Sheets

FIG. 5A
| MONTH | YEAR |
|---|---|
| NOV-DEC | 2007 |
| JULY-AUG | 2007 |
| NOV-DEC | 2006 |
| OCT-NOV | 2006 |
| MAY-JUNE | 2006 |
| NOV-DEC | 2005 |
| AUG-SEPT | 2005 |
| NOV-DEC | 2004 |
FIG. 5B
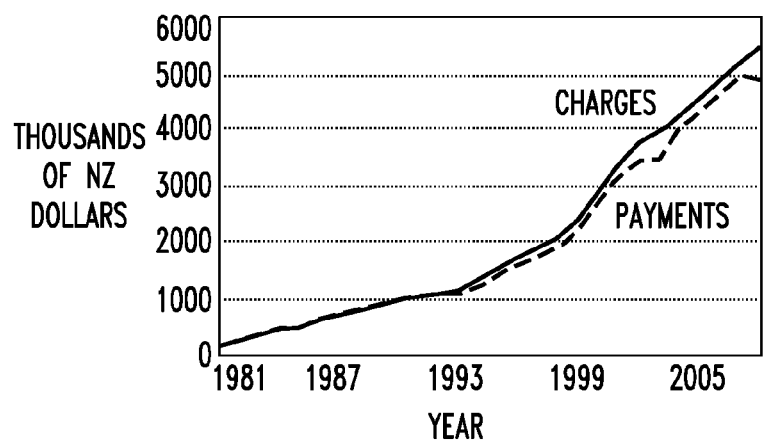
FIG. 5C
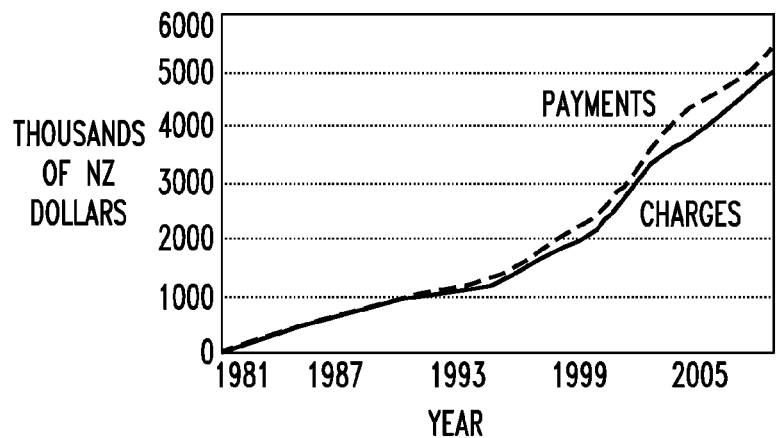

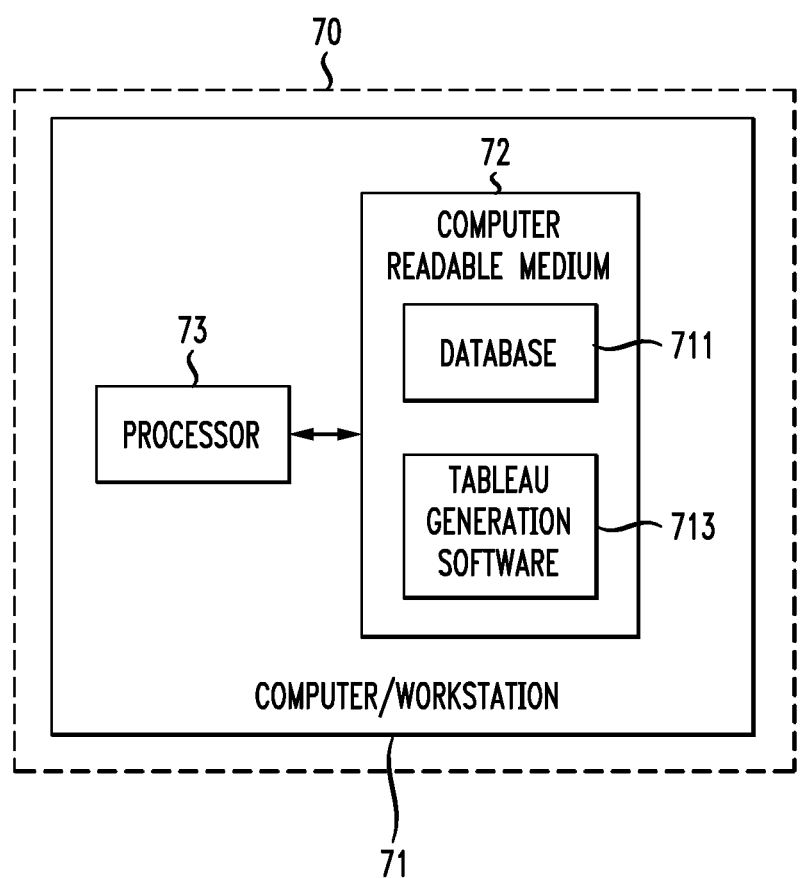

CONSERVATION DEPENDENCIES

BACKGROUND AND SUMMARY

The present invention relates to data analysis and, more particularly, to situations in which a "conservation law" exists between related quantities.

Given a pair of numerical data sequences—call them a and b—and an ordered attribute t such as time, the quantities obey a conservation law when that the sum of the values in a up to T equals the sum of the values in b up to T, for all t=T. Thus, current flowing into and out of a circuit node obeys a conservation law because the amount of current flowing into the node equals the amount of current flowing out.

Thus in accordance with the present invention, we have recognized that even when two numerical sequences do not strictly obey a conservation law, it can be useful to carry out a conservation-law-based analysis of such data and, more specifically, to generate data indicating the degree to which the conservation law is or is not obeyed or satisfied. Examples of such pairs of sequences are a) the number of inbound packets at an IP router versus the number of outbound packets; b) the number of persons entering a building versus the number of persons leaving; and c) the dollar value of the charges run up by a group of credit card holders versus the payments made by those credit card holders We have thus recognized that a conservation law is often an abstract ideal against which real data may be calibrated. Short-term deviations naturally occur from delays and measurement inaccuracies (credit card holders carry a balance; two people who enter a building at the same time may leave at different times, packets entering an IP router may be buffered therein and may thus encounter delays between the router input and output ports, etc.). Major violations may be caused by unusual phenomena or data quality problems; e.g., the reported number of people entering a building may be consistently higher than the number of people leaving (via the front door) if there exists an unmonitored side exit.

We have thus further recognized that it would be useful to discover for which portions, or "subsets," of the data a conservation law approximately holds (or fails) and to summarize them in a semantically meaningful way. Such a summarization allows one to, for example, quantify the extent of missing or delayed events that the data represents.

To this end, and in accordance with an aspect of the invention, we define what we call a conservation dependency. A conservation dependency is, in essence, an underlying conservation law coupled with a tableau. The tableau provides information about the degree which particular subsets of the data do or do not satisfy the underlying conservation law, the former being referred to as a "hold tableau" and the latter being referred to as a "fail tableau." Specifically, a hold tableau identifies subsets of the data (e.g., ranges of time for a time-ordered sequence of data) that satisfy the underlying conservation law to at least a specified degree, or "confidence." By contrast, a "fail" tableau identifies subsets of the data that do not satisfy the underlying conservation law to at least a specified degree. Which type of tableau is the more useful for understanding properties of the data will depend on the nature of the data.

Consider, for example, sequences of credit card charges and payments over time for a given bank. In a general sense, the aggregate amount of charges over time tends to be equal to the aggregate amount of payments because most people pay their bills. Thus the conservation law "charges=payments" is an appropriate model to consider when analyzing such data. However, the aggregate of charges up to any given point in time are going to exceed the aggregate of payments up to that same point in time because of payment grace periods and other factors such as spending habits. Thus in this setting the conservation law "charges=payments" holds only approximately.

That being said, seeing, through a tableau such as that shown FIG. 5, the degree (confidence) to which the conservation law "charges=payments" is or is not satisfied can help the bank understand customer patterns. Specifically, the appearance in a fail tableau of particular time periods (corresponding to subsets of the data) for which the data's confidence is below some level $\hat{c}$ means that the conservation law is relatively unsatisfied during those time periods, meaning, in turn, that during those time periods the total outstanding balance owed to the bank is relatively high. Thus seeing from the fail tableau that the conservation law "charges=payments" is relatively unsatisfied during the holiday shopping season in November and December would be a confirmation that that is a time when people regularly fall behind on payments. Or seeing from a fail tableau that, for a given confidence level $\hat{c}$, there are more time periods in recent years versus less recent years where outstanding balances are high would suggest that people are having an increasing difficult time keeping up with their debts.

More rigorously, assume a data set comprising a pair of numerical sequences $a=\{a_1, a_2, \ldots a_i, \ldots a_n\}$ and $b=\{b_1, b_2, \ldots b_i \ldots b_n\}$ with $a_i$, $b_i \geq 0$ and for which the $i^{th}$ pair of values, $(a_i, b_i)$, is associated with the $i^{th}$ value, $t_i$, of an ordered attribute $t=\{t_1, t_2, \ldots t_i, \ldots t_n\}$.

Given such a data set, the invention provides a tableau which comprises one or more subsets of values of the ordered attribute t that meet at least a first specified criterion, that criterion being is that, for at least a specified fraction $\hat{s}$ of the data set, a confidence measure for the pairs of values associated with each subset in the tableau is a) at least equal to a confidence value $\hat{c}$ (when we want to provide a hold tableau and b) no more than a confidence value $\hat{c}$ (when we want to provide a fail tableau). The confidence measure for the pairs of values associated with each subset in the tableau is a measure of the degree to which those pairs of values deviate from an exact conservation law for the data in question.

In illustrative embodiments of the invention, the confidence measure for the pairs of values $\{(a_i, b_i), (a_{i+1}, b_{i+1}), \ldots, (a_j, b_j)\}$ for any interval $\{i, i+1, \ldots, j\}$, is a function of an area between two curves $A=\{A_1, A_2, \ldots A_i, \ldots A_n\}$ from a where $A_0=0$ and $A_i=\Sigma_{j \leq i} a_j$ and $B=\{B_1, B_2, \ldots B_i, \ldots B_n\}$ from b where $B_0=0$ and $B_i=\Sigma_{j \leq i} b_j$. That area, in particular is the area between a segment of curve A between $A_i$ and $A_j$ and a segment of curve B between $B_i$ and $B_j$.

DRAWINGS

FIG. 5A shows a fail tableau, pursuant to the principles of the present invention, for credit card data in New Zealand;

FIG. 5B shows credit card charges and payments for the Bank of New Zealand for Decembers between 1981-2008;

FIG. 5C shows Bank of New Zealand credit card charges/payments data over a period of years depicted in shows credit card charges and payments for the Bank of New Zealand for Januaries between 1981-2008;

FIGS. 6A through 6C illustrate the computer running time of algorithms implementing the present invention; and.

FIG. 7 shows a system in which the present invention is illustratively implemented.

DETAILED DESCRIPTION

1 INTRODUCTION

Many constraints and rules have been used to represent data semantics and analyze data quality: functional, inclusion and sequential dependencies [2, 6, 11], association rules [1], etc. We identify a broad class of tools that are not covered by existing constraints, where a "conservation law" exists between related quantities. Given a pair of numerical sequences, call them a and b, and an ordered attribute t such as time, an exact conservation law states that the sum of the values in a up to T equals the sum of the values in b up to T, for all t=T. We propose a new class of tools—conservation dependencies—to express and validate such laws.

Conservation laws are obeyed to varying degrees in practice, with strong agreement in physics (current flowing in=current flowing out of a circuit), less so in traffic monitoring (number of inbound packets at an IP router=number of outbound packets; number of persons entering a building=number of persons leaving), and perhaps even less so in finance (charges=payments). Indeed, conservation laws are often abstract ideals against which real data may be calibrated. Short-term deviations naturally occur from delays and measurement inaccuracies (credit card holders carry a balance; two people who enter a building at the same time may leave at different times, etc.). Major violations may be caused by unusual phenomena or data quality problems; e.g., the reported number of people entering a building is consistently higher than the number of people leaving (via the front door) if there exists an unmonitored side exit. When it is unknown for which portions of the data the law approximately holds (or fails), discovering these subsets and summarizing them in a semantically meaningful way is important.

1.1 Motivating Examples

Consider sequences of credit card charges and payments over time. Because of payment grace periods and other factors such as spending habits, we expect the "charges=payments" law to hold only approximately. The degree (confidence) to which this law is satisfied should depend on the duration and magnitude of any imbalance, and can help understand customer patterns. Taking the ratio of total payments and total charges in a given time interval is insufficient as it does not take delays into account: a customer who regularly pays her bills would have the same confidence as one who carried a balance throughout the time interval and then paid all her bills at the end. Furthermore, since we may only have access to aggregated data due to privacy issues (e.g., total monthly charges and payments for groups of customers), it may not be possible to correlate individual charges with payments and calculate the average payment delay. Instead, at any time T, we assert that the cumulative charges and payments up to T cancel each other out.

Figure 1:
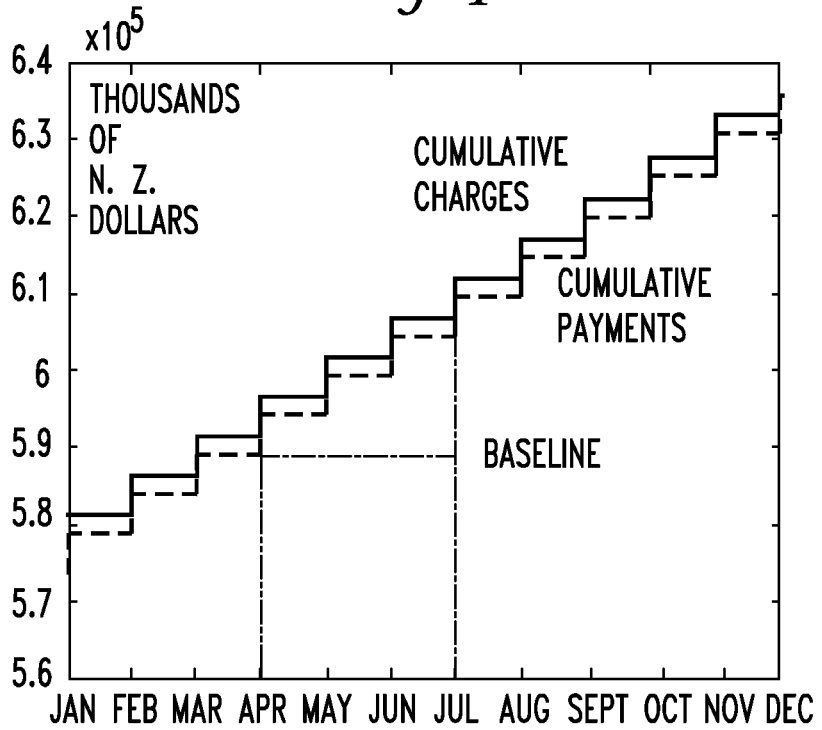
FIG. 1 is a chart of illustrative data to which the present invention can be applied, the chart showing aggregated credit card charges and payments over a period of time in New Zealand, taken as an example.

In FIG. 1, we transform the (non-negative, but not necessarily non-decreasing) monthly charges and payments from the Reserve Bank of New Zealand, aggregated over all customers (www.rbnz.govt.nz/statistics/monfin), into (non-decreasing) cumulative totals. A 12-month excerpt is shown, during which there is a gap between the cumulative charges and payments at the end of every month; the initial gap corresponds to past unpaid charges. The duration and magnitude of violations in the illustrated interval (April-July) is related to the area between the charge and payment curves as a fraction of the area under the charge curve. However, the height of the curves at the beginning of an interval, and therefore the area underneath, depends on the total charges and payments from the past. In particular, the confidence of the illustrated interval would be above zero even if no payments were made (i.e., if the payment curve followed the horizontal line labeled "baseline," whose height corresponds to the height of the payment curve at the beginning of the interval). Instead, we take the area between the curves divided by the area between the top curve and the baseline.

We refer to the above measure as the balance model since it penalizes for the outstanding balance existing just before a given interval. We may also ignore prior imbalance as a way of dealing with permanently missing or lost values. For example, we can ask if a customer would have a good credit rating if the outstanding debt at the beginning of the interval were either forgiven or paid down, while penalizing new debt in the usual way. In FIG. 1, this corresponds to either shifting the charge curve down to the payment curve or shifting the payment curve up to the charge curve, so that both curves start at the same point at the beginning of the interval. We call the former the debit model, since it removes a charge equal to the outstanding balance, and the latter the credit model, since it credits a payment to cover the outstanding balance. We will formalize the models and give examples in Section 3.

Figure 2:
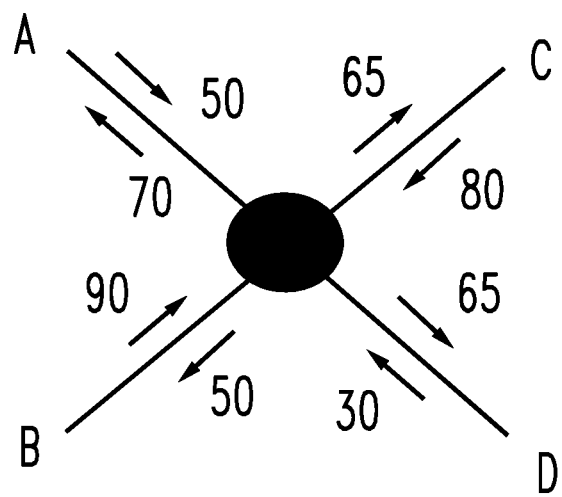
FIG. 2 is a conceptual diagram showing other illustrative data to which the present invention can be applied, specifically counts of incoming and outgoing traffic of a node, such as a packet router.

Our second example is network traffic monitoring, where the traffic entering a node (e.g., Internet router, road intersection, building), aggregated over the incoming edges (links, roads, doorways) should equal the traffic exiting the node, aggregated over the outgoing edges [12]. FIG. 2 illustrates a node with four bidirectional edges, whose weights correspond to inbound and outbound traffic aggregated over some time interval. Observe that the conservation law only holds at the node level, not for individual edges. That is, the law can only be observed by first (topologically) aggregating multiple measurements to form a and b. Prolonged violations may indicate problems with the measuring infrastructure: sensors may be malfunctioning, a new link may be attached to a router, but is not being monitored, etc. Temporary violations are also useful to report as they may identify interesting or suspicious events causing delays at the node. As in the previous example, there is usually no one-to-one mapping between individual inbound and outbound packets: sensors report aggregated counts, network traffic summaries are aggregated due to privacy and efficiency issues, etc.

Figure 3:
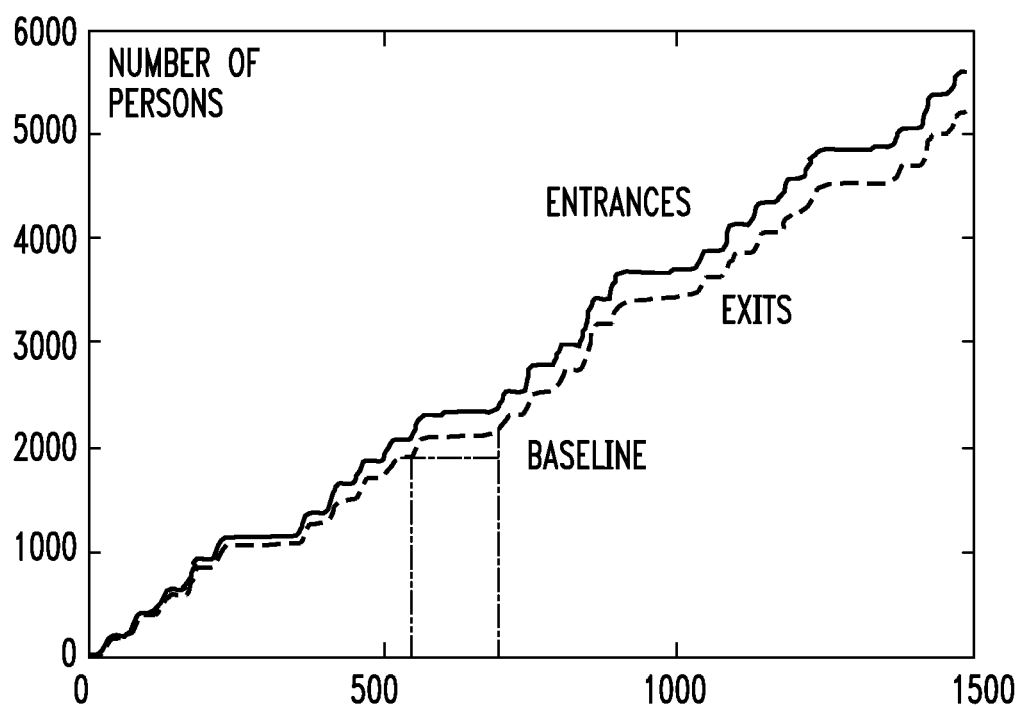
FIG. 3 is a chart of illustrative data to which the present invention can be applied, the chart showing cumulative entrance and exit counts for a building.

FIG. 3 plots two curves over a 30-day interval (48 "ticks" per day): the cumulative number of persons entering and exiting the front door of a building at the University of California, Irvine (archive.ics.uci.edu/ml/datasets/CalIt2+Building+People+Counts), with counts reported by an optical sensor every half hour. As before, we have transformed the inputs into cumulative counts. There are five noticeable "steps" per week, corresponding to activity during weekdays and little traffic during weeknights and weekends. Interestingly, the cumulative curves continually diverge over time, indicating a persistent violation (perhaps there exists an unmonitored side exit). As before, the confidence of the illustrated interval is related to the area between the entrance and exit curves and the area between the entrance curve and the baseline. However, the credit and debit models are more appropriate here, so as to compensate for the gradually increasing divergence from the conservation law. In the balance model, intervals near the end of the sequences would have disproportionately low confidence because the accrued gap keeps growing over time.

We remark that our confidence measure is different from that used for time series similarity. To achieve high confidence with respect to a conservation dependency, the two cumulative curves must track each other closely, but need not be similar in terms of the pattern and shape-based properties commonly used for matching (e.g., translation and scale invariance, warping). Conversely, two time series considered similar could violate the conservation law.

1.2 Contributions and Organization

We formulate conservation dependencies (CDs) and propose measures to quantify the degree to which a CD is satisfied. We assume that the quantities participating in the CD, such as charges and payments, are obvious from the application. However, it is typically not obvious where in a large data set the CD holds (which is important for data mining and understanding data semantics) or fails (which is important for data quality analysis).

Definition 1 A $(\hat{c}, \hat{s})$-hold tableau is a collection of subsets, each of confidence at least $\hat{c}$, whose union has size at least a fraction $\hat{s}$ of the size of the universe. (In the simplest case, the subsets are just intervals of time.) We say simply hold tableau if $\hat{c}$, $\hat{s}$ are understood. Similarly, a $(\hat{c}, \hat{s})$-fail tableau is a collection of subsets, each of confidence at most $\hat{c}$, whose union has size at least a fraction $\hat{s}$ of the size of the universe; we say fail tableau if $\hat{c}$, $\hat{s}$ are understood. A tableau is either a hold tableau or a fail tableau.

Definition 2 The tableau discovery problem for CDs is to find a smallest (or almost smallest) hold or fail tableau for the given dataset.

Typically, $\hat{s}$ and $\hat{c}$ are supplied by the user or a domain expert. The minimality condition is crucial to producing easy-to-read, concise tableaux that capture the most significant patterns in the data.

FIG. 5A shows a fail tableau for the credit card data from FIG. 1, with c=0.8. It suggests that people regularly fall behind on payments during the holiday shopping season in November and December. In Table 2, we show a fail tableau for the building entrance data from FIG. 3 using the credit model with c=0.6. This tableau identifies temporary violations, corresponding to events that occurred in the building, when a group of people entered the building and stayed until the event was over. Notably, these findings were not obvious from manual inspection of FIGS. 1 and 3, or from the raw counts--the instantaneous charges and payments or entrances and exits are almost never equal, and it is not clear if or when they cancel each other out.

There are two technical issues in tableau generation for CDs: identifying intervals with confidence above (resp., below) $\hat{c}$ and constructing minimal tableaux using some of them. The second issue corresponds to the partial set cover problem. Prior work shows how to use the greedy algorithm for partial set cover to choose a collection of intervals, each of confidence above (resp., below) $\hat{c}$, whose union has size at least $\hat{s}n$ [11]. (The greedy algorithm is guaranteed, when the input is a collection of intervals, to generate a set of size at most a small constant times the size of the optimal such collection, but in practice, the algorithm produces solutions of size close to optimal.) The first issue is constraint-specific and requires novel algorithms, which we propose in this paper.

Let n be the length of each sequence participating in the given CD. We define a candidate interval [i,j], where $1 \le i \le j \le n$, as one whose confidence is above (resp., below) $\hat{c}$. Since larger intervals are better when constructing minimal tableaux

TABLE 1

Example tableau on network traffic data

| Router type | Router name | Time interval |
| --- | --- | --- |
| Edge | Router100 | Jan 1-Jan 15 |
| Backbone | * | Jan 12-Jan 31 |

(fewer are needed to cover the desired fraction of the data), we are only interested in left-maximal candidate intervals, i.e., for each left endpoint, the longest possible right endpoint satisfying confidence. There are at most n maximal candidates, but an exhaustive algorithm tests all $\Theta(n^2)$ possible intervals. We propose approximation algorithms that run in $O(1/\epsilon n \log n)$ time (under a reasonable assumption), and return maximal intervals with confidence above a slightly lower threshold $\hat{c}/1+\epsilon$ $$\frac{\hat{c}}{1+\epsilon}$$

for hold tableaux, or below a slightly higher threshold of $(1+\epsilon)\hat{c}$ for fail tableaux. The running time of our algorithms depends on the area under the cumulative curves, but we will show that they are over an order of magnitude faster on real data sets than an exhaustive solution, even for small $\epsilon$.

We also consider the CD tableau discovery problem when many pairs of sequences are given (e.g., one per customer or one per network node), each labeled with attributes such as customer marital status and city of residence, or router name, location and model. Here, each tableau entry is an interval on the ordered attribute, plus a pattern on the label attributes that identifies a cluster of pairs of sequences. For example, Table 1 identifies two subsets of a sequence of inbound and outbound network traffic: Router100 (of type Edge) measurements taken between January 1 and 15, and measurements from all Backbone routers (the "*" denotes all values of a given attribute) between January 12 and 31.

Finally, we illustrate the utility of CDs and their discovered tableaux, and the efficiency of our algorithms, on a variety of real data sets. These include the credit card and building entrance/exit data shown in FIGS. 1 and 3, as well as network traffic summaries and job submission logs on a computing cluster.

The remainder of this paper is organized as follows. Section 2 discusses related work. In Section 3, we give formal problem statements. In Section 4, we present the tableau algorithms. Section 5 presents experimental results, and Section 6 concludes the paper.

2 Related Work

Our work is most closely related to existing work on tableau discovery for functional [4, 7, 10] and sequential dependencies [11]. While we borrow the general idea of tableau discovery, we propose novel constraint and confidence metrics, and novel algorithms for efficiently identifying candidate intervals. In particular, even if the interval finding algorithm from [11] could be adapted to CDs, it would not be applicable because our confidence definitions violate one of its assumptions, namely that the confidence of two highly overlapping intervals of similar size be similar (to see this, construct an interval I' by starting with I and adding a single arbitrarily large "charge" without a corresponding "payment").

Concepts similar to conservation laws have been discussed in the context of network traffic analysis [9, 12], clustering data for deduplication [3], and consistent query answering under "aggregation constraints" [5]. This paper is the first to address confidence metrics and tableau discovery for CDs.

The data mining literature investigated finding intervals that satisfy various properties, e.g., mining support-optimized association rules [8], where the objective is to find intervals of an array having a mean value above a specified minimum. That solution is not compatible with our confidence definitions, but can express two related metrics. The first metric divides the total "payments" by the total "charges" in a given interval. As discussed in Section 1.1, this definition does not account for delays. The second definition divides the total cumulative payments by the total cumulative charges in a given interval, which amounts to piecewise computation of the areas under the cumulative curves, where the "baseline" is always at zero. However, intervals near the end of the sequence have relatively larger areas under the cumulative curves, thereby skewing the resulting confidence (in contrast, our measures use variable baselines). In Section 5, we experimentally show that these measures are not effective at detecting violations in the conservation law.

3 Preliminaries

Let $a = \langle a_1, a_2, \ldots, a_n \rangle$ and $b = \langle b_1, b_2, \ldots, b_n \rangle$, with $a_i, b_i \geq 0$, be two sequences with respect to some ordered attribute such as time; we assume uniform spacing on this attribute between adjacent indices. When a and b are governed by a conservation law, a can be thought of as containing counts of responses to events whose counts are contained in b (e.g., a=payments and b=charges). Given an interval $\{i, i+1, \ldots, j\}$, which we write as $[i, j]$, let $a[i, j]$ denote the subsequence of a that includes entries in the positions i through j inclusive. We also define the derived cumulative time series $A = \langle A_0, A_1, \ldots, A_n \rangle$ from a where $A_0 = 0$ and $A_i = \Sigma_{j \leq i} a_j$. B is defined analogously based on b. We assume B dominates A, that is, $B_i \geq A_i$ for all i. Even if this is not the case, there are various (domain-specific) ways of preprocessing to satisfy this assumption; e.g., in the credit card example, we can account for prepayment toward future charges by setting $A'_l := \min\{A_l, B_l\}$ and $B'_l := B_l$ for all $1 \leq l \leq n$.

3.1 Confidence Measures

We define the confidence of a given CD within the scope of interval $I = [i, j]$ in terms of the area between the curves A and B in this interval, normalized by the area under B, down to a "baseline," to be formally defined below. This gives the "divergence" of A with respect to B; confidence is then defined as the complement.

Definition 3 Given two cumulative sequences A and B, the confidence con $f(I)$ of A with respect to B in interval $I = [i, j]$ ($1 \leq i \leq j \leq n$) is defined as $$1 - \frac{\sum_{l=i}^{j}(B_l - A_l)}{\sum_{l=i}^{j}(B_l - A_{i-1})}.$$

Note that $0 \leq \text{con } f(I) \leq 1$. Here $A_{i-1}$, the cumulative amount from the response curve up to but not including i, is the baseline from which we measure area under B, so that the gap between A and B to just before i is taken into account. Clearly, intervals with different starting points may have different baselines. Alternatively, this formula can be written as the ratio of the area under A to the area under B, in the interval [i, j], using the same baseline $A_{i-1}$:

$$\frac{\sum_{l=i}^{j}(A_l - A_{i-1})}{\sum_{l=i}^{j}(B_l - A_{i-1})}.$$

We call the above confidence measure the balance model (and will denote it as con $f^b$ when there is ambiguity as to which confidence function is used) because it penalizes for the balance $B_{i-1} - A_{i-1}$ existing just before i. We may wish to compensate for this balance, so that only events (and responses) that occur within [i, j] affect confidence. However, only disparities not due to delay should be compensated for since resolution of such delays may occur within [i, j]. Therefore, we use the smallest difference between A and B in the suffix from i to n as an estimate of loss, since this difference is guaranteed not to be due to delay. Thus, the total compensation $\Delta_i$ at i is defined as $\min_{i \leq l \leq n}\{B_l - A_l\}$.

There are two natural ways to discount an outstanding balance at i. We can give a credit to A to inject responses to events, or we can debit B to cancel unmatched events. In the former (referred to as the credit model), A is credited by $\Delta_i$ at i. In the latter (referred to as the debit model), B is debited by $\Delta_i$ at i. Either way, note that our choice of $\Delta$ ensures that B still dominates A.

Choosing one model over another depends on the aspects that one wishes to highlight. We can use the credit model if we suspect missing data in A, or wish to calculate what the confidence would have been had the unmatched events seen responses at i. The debit model is more appropriate when events in B may have been spuriously reported, or when we wish to calculate the confidence had those events not occurred.

Definition 4 Given two cumulative sequences A and B, the confidence con $f^c(I)$ of A with respect to B in interval $I = [i, j]$, with credit applied at i, is defined as $$\frac{\sum_{l=i}^{j}(A_l - A_{i-1} + \Delta_i)}{\sum_{l=i}^{j}(B_l - A_{i-1})}.$$

Definition 5 Given two cumulative sequences A and B, the confidence con $f^d(I)$ of A with respect to B in interval $I = [i, j]$, with debit applied at i, is defined as $$\frac{\sum_{l=i}^{j}(A_l - A_{i-1})}{\sum_{l=i}^{j}(B_l - A_{i-1} - \Delta_i)}.$$

We state the following simple claim without proof. Given an interval I, con $f^b(I) \leq \text{con } f^d(I) \leq \text{con } f^c(I)$.

Figure 4A:
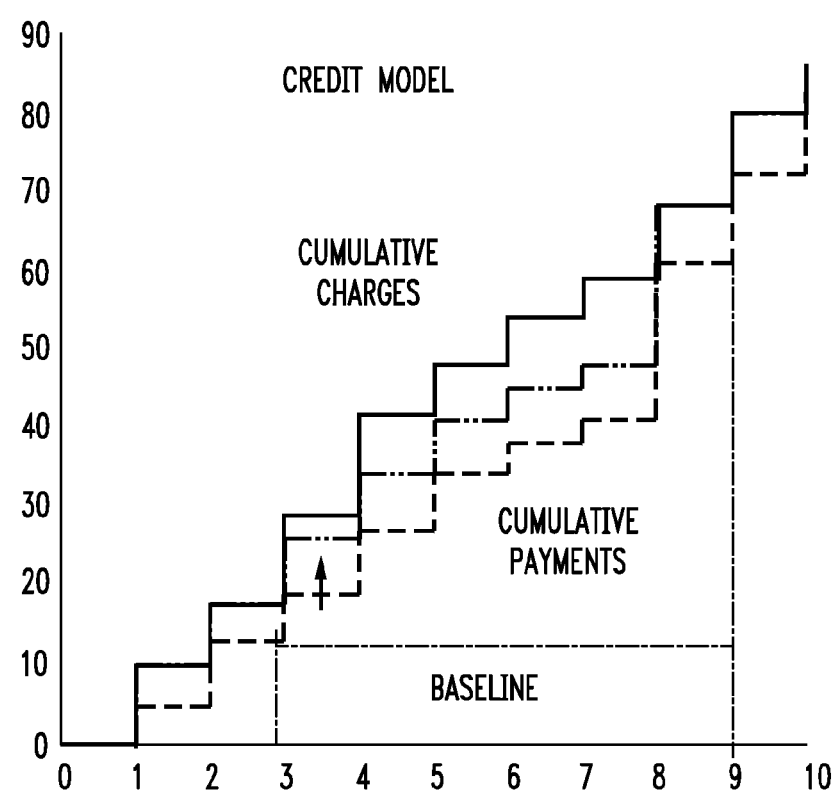
FIGS. 4A and 4B illustrate confidence measures used in the illustrative embodiments.
Figure 4B:
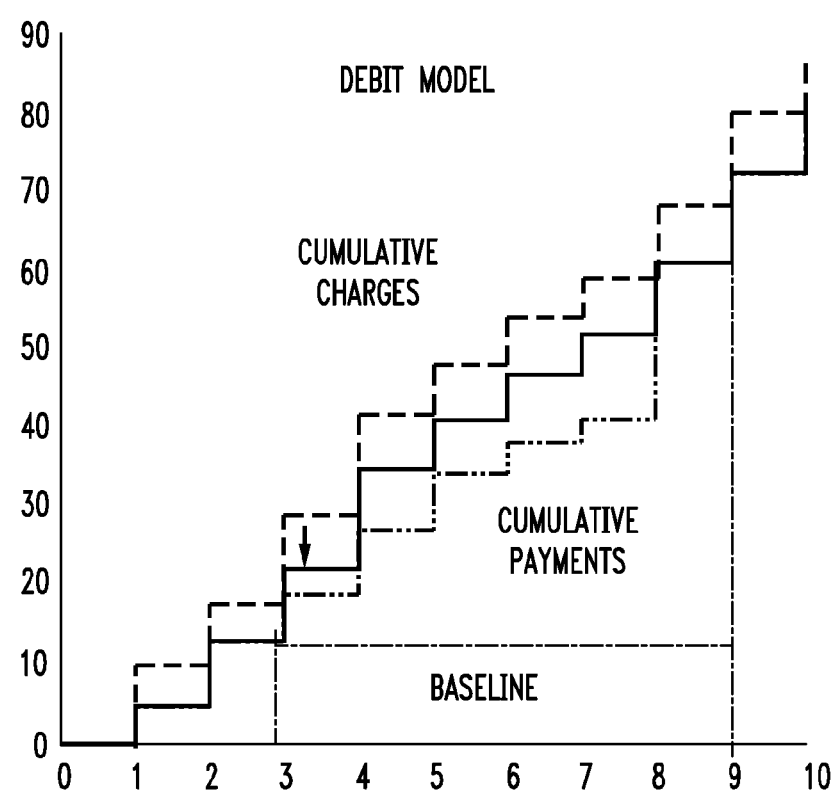

FIGS. 4A and 4B show sequences of charges and payments, zooming in on I=[3, 8] (technically, I=[3, 9) since we want to include the contribution of the divergence at time 8). In FIG. 4A, we compute con $f^c(I)$ by shifting the cumulative payment curve up by seven, which is the smallest difference between the cumulative charges and payments in the suffix. In FIG. 4B, con $f^d(I)$ moves the cumulative bill curve down by seven. In Appendix A, we work out that con $f^b(I)=0.64$, con $f^d(I)=0.79$ and conf$^c(I)=0.83$, and compare these numbers to the confidence according to the algorithm from [8] (recall Section 2).

In practice, there may be natural delays between events and responses, e.g., credit card payments can be made up to a month after a bill arrives. When delays are constant and persistent, their impact on confidence can be removed by simple preprocessing: we set $A'_i := A_{i+s}$, for a time shift of $s$, and compute the confidence using curves A' and B. Finding the right shift length is an important problem but is outside the scope of this paper; we assume that $s$, if any, is given.

3.2 Tableau Generation

We now define the interval candidate generation problem, which finds a set of left-maximal intervals (for each i, the largest j approximately satisfying confidence).

Definition 6 The CD Interval Discovery Problem is, given two derived cumulative sequences A and B with $A^i \leq B^i$ for all i, and confidence threshold c, to find all maximal intervals (if any exist), all of whose confidence is at least c (for hold tableau), resp., at most c (for fail tableau), as measured by either conf$^b$, conf$^c$, or conf$^d$.

We then use the partial interval cover algorithm from [11] to construct a minimal tableau from the discovered maximal intervals (recall Definition 2).

So far, we assumed that the input consists of a single pair of sequences. Due to space constraints, we discuss interval and tableau generation for multiple pairs of sequences in Appendix B.

4 Algorithms

In this section, we present novel algorithms to (almost) generate, for each i, either a largest $j \geq i$ such that the confidence of [i, j] is at least $\hat{c}$, in the case of a hold tableau, or, in the case of a fail tableau, a largest $j \geq i$ such that the confidence of [i, j] is at most $\hat{c}$, under the balance, credit, and debit models. (The "almost" is explained below.) We begin with hold tableaux, exhibiting later the changes necessary to handle fail tableaux.

4.1 Hold Tableau Interval Selection

We are given two integral sequences, $a = \langle a_1, a_2, \ldots, a_n \rangle$ and $b = \langle b_1, b_2, \ldots, b_n \rangle$, as well as the confidence threshold parameter $\hat{c}$. Using linear time for preprocessing, the cumulative time series A and B can be obtained. A naive algorithm may consider all quadratically-many intervals and compute the confidence for each chosen interval individually to check if it satisfies the threshold $\hat{c}$. This leads to a $\Theta(n^3)$-time algorithm. However, again by simple linear-time preprocessing, the time complexity of this naive exhaustive search can be reduced to $\Theta(n^2)$. For large datasets a quadratic-time algorithm is infeasible to run. Hence, our goal is to design scalable algorithms in the same spirit as in previous works on other kinds of dependencies and association rules [8, 10, 11].

The intervals [i, j] that we report have confidence at least $\hat{c}/(1+\epsilon)$, though maybe not at least the target $\hat{c}$. We make this approximation to guarantee fast running time. However, if the longest interval beginning at i and having confidence at least $\hat{c}$ is [i, j*], the algorithm will report an interval [i, j'] with $j' \geq j^*$ having confidence at least $\hat{c}/(1+\epsilon)$. We give one simple generic algorithm, that works for all three models, balance, credit, and debit, and much more.

We have $0 = A_0 \leq A_1 \leq A_2 \leq A_3 \leq \ldots \leq A_n$ and $0 = B_0 \leq B_1 \leq B_2 \leq B_3 \leq \ldots \leq B_n$, satisfying $A_i \leq B_i$ for all i. From these two sequences, two more integral sequences, $\langle H_1^A, H_2^A, H_3^A, \ldots, H_n^A \rangle$ and $\langle H_1^B, H_2^B, H_3^B, \ldots, H_n^B \rangle$, are defined, in a problem-dependent way. These sequences must satisfy $A_l - H_l^A \geq 0$ and $B_l - H_l^B \geq 0$, for all $l \geq i$.

1. In the balance model, $H_i^A = H_i^B = A_{i-1}$;
2. in the credit model, $H_i^A = A_{i-1} - \min_{k \geq i}\{B_k - A_k\}$ and $H_i^B = A_{i-1}$; and
3. in the debit model, $H_i^A = A_{i-1}$ and $H_i^B = A_{i-1} + \min_{k \geq i}\{B_k - A_k\}$.

The reader can verify that these $H_i^A$ and $H_i^B$ values correspond to the baseline values already discussed earlier, and (hence) that $A_l - H_l^A \geq 0$ and $B_l - H_l^B \geq 0$ for all $l \geq i$. In all three cases, all the n $H_i^A$ and n $H_i^B$ values can be computed in O(n) time.

Definition 7 Define area$_A(i, j) = \Sigma_{l=i}^{j}(A_l - H_l^A)$ and area$_B(i, j) = \Sigma_{l=i}^{j}(B_l - H_l^B)$. (Note that the subscript on the H terms is i, not l.) Recall that the confidence con $f(i, j) =$ area$_A(i, j)/$area$_B(i, j)$, provided the denominator is positive.

The algorithm is very simple (see Appendix C for pseudocode):
1. For each i=1, 2, 3, ..., n, for each l=0, 1, 2, 3, ..., $\lceil \log_{1+\epsilon}$ area$_B(i, n) \rceil$, do:
    Calculate $r_{il}$, the largest j such that area$_B(i, j) \leq (1+\epsilon)^l$. (How to do so quickly is explained in Appendix D.)
2. For each i=1, 2, 3, ..., n, do:
    Calculate con $f(i, r_{il})$ for all l, and output interval [i, $r_{il}$] for the largest $r_{il}$ such that con $f(i, r_{il}) \geq \hat{c}/(1+\epsilon)$, if such an $r_{il}$ exists. (How to do so quickly is explained in Appendix D.)

Since the algorithm seeks the largest $r_{il}$, an efficient heuristic is to try the largest possible $r_{il}$ first, then the second largest, and so on, stopping as soon as it finds an interval of confidence at least $\hat{c}/(1+\epsilon)$.

We prove the following theorem in Appendix D.

Theorem 1 The total running time of the given algorithm for the balance, credit, or debit models is O(n $\log_{1+\epsilon}$ area$_B(1, n)$), which is O(1/$\epsilon$n lg area$_B(1,n)$) if $\epsilon \leq 1$.

Assuming that the area$_B(1, n)$ values are only polynomially large in n (or can be scaled downward along with the A's so as to become so), the lg area$_B(1, n)$ factor in the running time is only logarithmic in n. Indeed, if area$_B(1, n)$ were exponential in n, one would need n bits of storage just to represent one area$_B$ value, and arithmetic on such numbers could not be done in constant time.

The next theorem, which we prove in Appendix E, proves that the values produced by the algorithm are accurate.

Theorem 2 1. (No false positives) If the algorithm outputs an interval [i, j], then con $f(i, j) \geq \hat{c}/(1+\epsilon)$.
2. (No false negatives) Given i, let j*$\geq i$ be largest such that con $f(i, j^*) \geq \hat{c}$ (if such a j*$\geq i$ exists). Then the algorithm produces an interval [i, j'], $j' \geq j^*$, having confidence at least $\hat{c}/(1+\epsilon)$.

To explain why we want $j' \geq j^*$, suppose an optimal tableau uses, say, m intervals, each of the form [i, j*], each of confidence at least $\hat{c}$, whose union covers at least a specified fraction, $\hat{s}$ of $\{1, 2, \ldots, n\}$. We may assume that each j* is largest such that [i, j*] has confidence at least $\hat{c}$. By the "no-false-negatives" property, the algorithm will generate an interval [i, j'], $j' \geq j^*$, so that [i, j'] $\supseteq$ [i, j*], and hence there will exist a tableau of at most m intervals [i, j'] produced by the algorithm (with intervals having confidence at least $\hat{c}/(1+\epsilon)$, not $\hat{c}$).

4.2 Fail Tableau Interval Selection

For fail tableaux, we want, ideally, to generate intervals [i, j'], where j' is largest such that con $f(i, j') \leq \hat{c}$ (as opposed to con $f(i, j') \geq \hat{c}$, in the case of hold tableau). We instead generate intervals with confidence at most $\hat{c}(1+\epsilon)$. It is important to note that while we now want confidence bounded above by $\hat{c}$ (or $\hat{c}(1+\epsilon)$), if the optimal interval is [i, j*], we still need $j' \geq j^*$, not $j' \leq j^*$. The reason is that, once again, we want to know that if the optimal tableau consists of m intervals, then there is a collection of m algorithm-generated intervals of equally high support.

For fail tableaux, instead of using the generic algorithm above, which involves $area_B(i, j)$, the generic algorithm for fail tableaux uses $area_A(i, j)$. We will need to treat the balance and debit models differently from the credit model. We start with the former two.

4.2.1 Fail Tableaux in the Balance and Debit Models

Here is the algorithm to choose intervals for fail tableaux in the balance or debit model (see Appendix F for pseudocode):
1. For each $i=1, 2, 3, \ldots, n$, for each $l=0, 1, 2, 3, \ldots, [\log_{1+\epsilon} area_A(i, n)]$, do:
   Calculate $s_{il}$, the largest j such that $area_A(i, j) \leq (1+\epsilon)^l$.
2. For each $i=1, 2, 3, \ldots, n$, do:
   Calculate con $f(i, s_{il})$ for all l, and output interval $[i, s_{il}]$ for the largest $s_{il}$ such that con $f(i, s_{il}) \leq \hat{c}(1+\epsilon)$, if such an $s_{il}$ exists.

We prove an analogue of Theorem 2 in Appendix G.

Theorem 3 1. (No false positives) If the algorithm outputs an interval $[i, j]$, then con $f(i, j) \leq \hat{c}(1+\epsilon)$.
2. (No false negatives) Given i, let $j^* \geq i$ be largest such that con $f(i, j^*) \leq \hat{c}$ (if such a $j^* \geq i$ exists). Then the algorithm produces an interval $[i, j']$, $j' \geq j^*$, having confidence at most $\hat{c}(1+\epsilon)$.

For running time, we state the following analogue of Theorem 1, which follows from the monotonicity of $H_i^A$ in the balance and debit models.

Theorem 4 The total running time of the algorithm to select intervals for fail tableaux in the balance and debit models is $O(n \log_{1+\epsilon} area_A(1, n))$.

4.2.2 Fail Tableaux in the Credit Model

The algorithm for fail tableaux using the balance and debit models relied on monotonicity of $H_i^A$, which, in the credit model, equals $A_{i-1} - \min_{k \geq i}\{B_k - A_k\}$ and which is provably not monotonic. The solution is to use the breakpoints $s_{il}$ defined for the balance model! Let us define $area_A^b(i, j)$ and $area_A^c(i, j)$ to be $area_A(i, j)$ in the balance and credit model, respectively. Specifically, $area_A^b(i, j) = \sum_{l=i}^{j}[A_l - A_{i-1}]$ and $area_A^c(i, j) = \sum_{l=i}^{j}[A_l - (A_{i-1} - \min_{k \geq i}\{B_k - A_k\})]$. Define $area_B^c(i, j)$ to be (as expected) the area for B between i and j in the credit model (specifically, $area_B^c(i, j) = \sum_{l=i}^{j}[B_l - A_{i-1}]$). Confidence con $f^c(i, j)$ is then defined to be $area_A^c(i, j)/area_B^c(i, j)$. The algorithm is (see Appendix F for pseudocode):
1. For each $i=1, 2, 3, \ldots, n$, for each $l=0, 1, 2, 3, \ldots, [\log_{1+\epsilon} area_A^b(i, n)]$, do:
   Calculate $s_{il}$ as in the algorithm above for fail tableaux in the balance model, specifically, $s_{il}$ is the largest j such that $area_A^b(i, j) \leq (1+\epsilon)^l$.
2. For each $i=1, 2, 3, \ldots, n$, do:
   Calculate con $f^c(i, s_{il})$ for all l, and output interval $[i, s_{il}]$ for the largest $s_{il}$ such that con $f^c(i, s_{il}) \leq \hat{c}(1+\epsilon)$, if such an $s_{il}$ exists.

The next two results, proved in Appendix H and I, respectively, characterize the efficiency and correctness of the above algorithm.

Theorem 5 The overall running time is $O(n \log_{1+\epsilon} area_A^b(1, n))$, which is $O(n \log_{1+\epsilon} area_A^c(1, n))$.

Theorem 6 1. (No false positives) If the algorithm outputs an interval $[i, j]$, then con $f^c(i, j) \leq \hat{c}(1+\epsilon)$.
2. (No false negatives) Given i, let $j^* \geq i$ be largest such that con $f^c(i, j^*) \leq \hat{c}$ (if such a $j^* \geq i$ exists). Then the algorithm produces an interval $[i, j']$, $j' \geq j^*$, having confidence con $f^c(i, j') \leq \hat{c}(1+\epsilon)$.

5 Experiments

We now show the effectiveness of conservation dependencies in capturing potential data quality issues and mining interesting patterns. We also investigate the trade-off between performance and tableau quality with respect to $\epsilon$, and demonstrate the scalability of the proposed algorithm. Choosing an appropriate confidence threshold is domain-specific and outside the scope of this work; we experimented with different values of $\hat{c}$ for the purpose of these experiments. Experiments were performed on a 2.2 GHz dual-core Pentium PC with 4 GB of RAM. All the algorithms were implemented in C. We used the following data sources.

People-Count (archive.ics.uci.edu/ml/machine-learning-databases/event-detection/CalIt2.data): counts of persons entering and exiting the front door of a building at the University of California, Irvine, as measured by an optical sensor. The entrance and exit sequences have 5040 data points each (one measurement every half an hour for 15 weeks). We also use a list of events scheduled in this building during this time period (archive.ics.uci.edu/ml/machine-learning-databases/event-detection/CalIt2.events).

NZ-Credit-Card (www.rbnz.govt.nz/statistics/monfin/): monthly aggregated credit card charges and payments reported by the Reserve Bank of New Zealand from January 1981 to August 2009.

TCP packet traces (ita.ee.lbl.gov/html/traces.html): we use the DEC-PKT-3 trace; n=177802. Here, there is a conservation law between the number of SYN packets (requests to start a TCP connection) and FIN plus RST packets (connection termination).

Network Monitoring: counts of incoming and outgoing traffic per router for several hundred routers, collected from a large network every five minutes for roughly 2 weeks (3800 measurements per router).

Job Log (gwa.ewi.tudelft.nl/pmwiki/pmwiki.php?n=Workloads.Gwa-t-1): trace of 1124772 jobs submitted to a grid computing cluster, coarsened to a time sequence at regular intervals. Here the conservation law is between the number of submitted jobs and the number of completed jobs.

5.1 Utility of Conservation Dependencies

Balance Model, New Zealand NZ-Credit-Card Data

NZ-Credit-Card has a confidence close to one, so the entire sequence is reported in the hold tableau (this is with the payments curve shifted ahead by 1 month to compensate for the standard credit card grace period). FIG. 5A shows the fail tableau with $\hat{c}=0.8$, using the balance model to find time periods with high outstanding debt. We see more intervals from the recent years, suggesting that the total outstanding balance has risen. Also, the consistent appearance of the interval November-December suggests that people charge more than they pay during the holiday shopping season in November and December, at least between 2004 and 2007. Perhaps not surprisingly, November-December of 2008 was not reported, when credit card debt was low due to dampened consumption during an economic recession [13]. There are no tableau intervals ending in January, indicating that unpaid charges from November and December were paid by January (i.e., adding January to a low-confidence November-December interval boosts confidence above 0.8, else intervals of the form November-January would have been included in the fail tableau instead).

The above result suggests that December charges were higher than December payments, but January payments were higher than January charges. FIGS. 5B and 5C confirms this, plotting charges and payments made only in Decembers (resp., Januaries) of each year. In the December plot, charges dominate payments, especially in the last five years. In the January plot, payments dominate charges.

We also tested the interval-finding algorithm from [8]. Recall from Section 2 that we can use this algorithm on sequences of either instantaneous values or cumulative amounts. In both cases, the hold tableau contains the entire data set with ĉ close to 1. With ĉ=0.8 on instantaneous values, the fail tableau contains a single interval of length one (January 1981). Since the magnitudes of monthly charges and payments have increased over time, this result reflects that the difference between charges and payments was proportionately larger in 1981. With ĉ=0.9, we get only the three small intervals: January-March 1981, December 2003 and December 2008. If, instead, we use cumulative amounts, the fail tableau contains only January-February 1981 with ĉ=0.8, and January-May 1981 with ĉ=0.9. To explain this, recall from Section 2 that this measure uses a baseline of zero for each interval, meaning that intervals starting later in the sequence end up with artificially high confidences that are well above ĉ. and therefore are not selected for the fail tableau.

Credit Model, People-Count Data

This data set exhibits a persistent violation of the conservation law (recall FIG. 3). As a result, only short intervals from the beginning of the sequence appear in hold tableaux. For fail tableaux in the balance model, all later intervals have low confidence from accrued imbalances (likely due to people occasionally exiting through a side door and therefore not being recorded properly). Instead, we use the credit model to ignore past imbalance (i.e., assume that people currently in the building have left). During July and August, sixteen events were scheduled in this building. In the time intervals surrounding these events, we expect a temporary discrepancy between the number of people entering the building and the number of people leaving. We generated a fail tableau with ĉ=0.6 and found that they correspond to these known events. Note that since we are using the credit model, any reported intervals have low confidence due to divergence within them and not due to imbalances carried over from the past. In Table 2, we report the maximal intervals corresponding to five days in August during which at least one known event took place. Our intervals closely match the known events, whose durations are shown on the left. On August 4th, in addition to the two intervals spanning the event, we also report the interval 12:30-14:30. This is likely because of the imbalance of traffic occurring during lunch time. To validate this, we generated maximal intervals for other days in this data set, when no event was scheduled, and found that either no intervals were returned, or some intervals in between 11:30 and 15:00 were obtained.

TABLE 2

Selected events (left) and corresponding fail tableau intervals from the same day (right) in People-Count data, using the credit model with ĉ = 0.6

| Event date and time | Tableau interval(s) from the same day |
| --- | --- |
| August 2, 15:30-16:30 | 15:30-16:00 |
| August 4, 16:30-17:30 | 12:30-14:30, 16:00-17:00, 16:30-17:30 |
| August 9, 08:00-16:00 | 06:30-17:00 |
| August 9, 11:00-14:00 | |
| August 12, 08:00-11:00 | 06:30-12:00 |
| August 18, 08:00-17:00 | 06:00-13:30, 12:00-16:30, 13:30-17:30 |
| August 18, 18:00-20:30 | 17:00-19:00, 17:30-20:30 |

Debit Model, Network Monitoring Data

Next, we examine the network monitoring data for data quality problems of the form illustrated in FIG. 2, where some links are not monitored, causing an imbalance between the incoming and outgoing traffic passing through a router. The entire data set has a confidence of approximately 0.9, and contains several hundred pairs of sequences, one for each router, labeled with the router name and type (see Appendix B for more details on tableau discovery with multiple pairs of time series). We use the debit model for fail tableaux, which is appropriate here since it subtracts incoming packets whose outgoing counterparts have not been measured. Table 3 shows a fail tableau with ĉ=0.5, on router type, name, and time interval (with time represented as integers from one to 3800). Note that all but one violating router report an imbalance throughout all 3800 time coordinates.

We now zoom in on Router-7. It appears that the links which were not being monitored up to time 3610 started being monitored afterward. To confirm this, we single out the curves corresponding to this router and show two hold tableaux in Table 4. Interestingly, only three short intervals have confidence above 0.99, suggesting that even if all links are monitored correctly, small violations of the conservation law are normal. These could happen for many reasons: delays at the router, corrupted packets getting dropped at the router, etc. Using ĉ=0.9 yields a longer interval that only slightly

TABLE 3

Fail tableau for the network monitoring data set, using the debit model with ĉ = 0.5

| Type | Name | Interval |
| --- | --- | --- |
| Core | Router-1 | 1-3800 |
| Core | Router-10 | 1-3800 |
| Core | Router-12 | 1-3800 |
| Edge | Router-6 | 1-3800 |
| Hub | Router-25 | 1-3800 |
| Edge | Router-7 | 1-3610 |

TABLE 4

Hold tableaux for Router-7 using the debit model

| confidence above 0.99 | confidence above 0.9 |
| --- | --- |
| 3650-3660 | 3530-3800 |
| 3660-3680 | |
| 3790-3800 | | overlaps with the "bad" interval from the fail tableau.

5.2 Quality of Approximation

Since our algorithms test a relaxed confidence threshold, clearly it is possible that left-maximal intervals returned by our algorithm may not exist in the exact set of left-maximal intervals. We now examine the impact of the relaxation factor ε on how these intervals differ in practice. Using the People-Count data set with the credit model, we generated hold intervals using a variety of values for ĉ greater than 0.99, and fail intervals using a variety of values for ĉ less than 0.8. We then measured how well these intervals overlapped with those from the exact set, with overlap computed using the Jaccard coefficient. That is, for each I generated by our algorithm, we found I* from the exact set maximizing $$\frac{|I \cap I^*|}{|I \cup I^*|}.$$

Table 5 summarizes the results for fail intervals using ĉ=0.8 as the average Jaccard coefficient value. We obtain coefficients close to one, indicating that each approximate interval highly overlaps with at least one exact interval. Similar results were obtained for hold intervals and with other choices of ĉ.

TABLE 5

Interval overlap using People-Count data

| | ϵ | | | |
|---|---|---|---|---|
| | 0.001 | 0.002 | 0.005 | 0.01 |
| Jaccard | 0.9986 | 0.9987 | 0.979 | 0.9519 |

5.3 Performance and Scalability

Figure 6A:
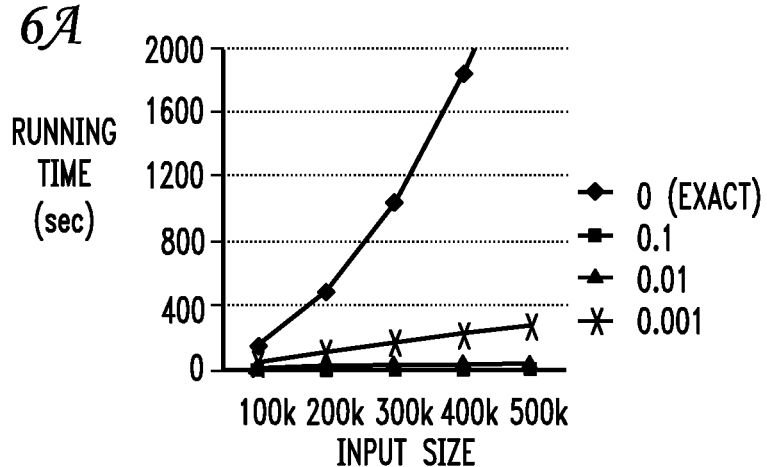
Figure 6B:
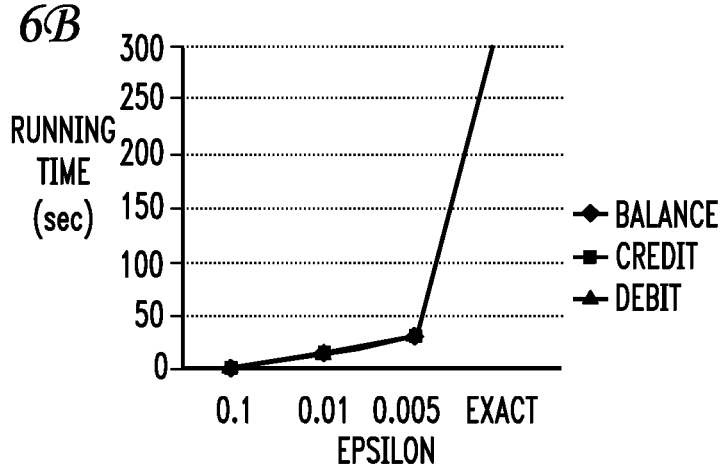
Figure 6C:
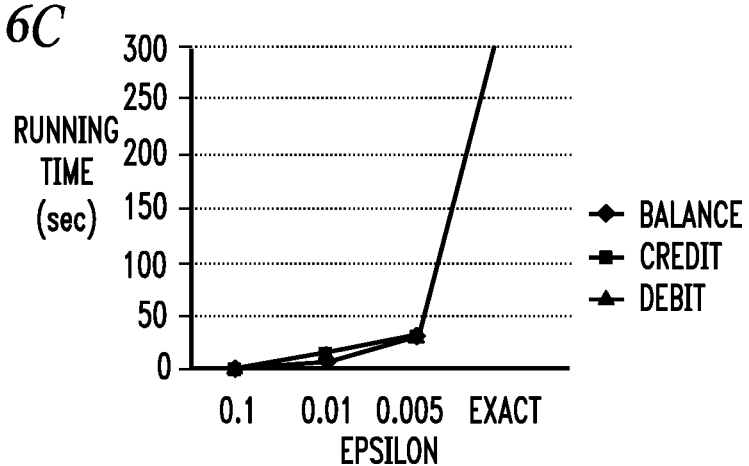

FIGS. 6A through 6C compares the running time of our algorithms against an exhaustive algorithm with quadratic running time. We only report the wallclock time for generating candidate maximal intervals for a hold tableau, and exclude the preprocessing and tableau construction times, which are both linear. Time is measured in seconds using the Unix clock command. On the left, we plot the performance for several values of ϵ on various prefixes of Job-Log data, using the balance model and a ĉ slightly higher than the confidence value of the entire data. Our algorithm scales gracefully, and, even for small values of ϵ such as 0.001, is an order of magnitude faster. The middle figure plots the running times to generate hold tableau intervals using DEC-PKT-3 data for various confidence models and values of ϵ; the figure on the right repeats this for fail tableaux. Again, we use a confidence threshold that is slightly higher than the confidence of the overall data set. As before, we observe an order-of-magnitude performance improvement, even for small ϵ. In all three plots, note the linear dependence of running time on 1/ϵ over positive epsilon.

6 Conclusions

We proposed conservation dependencies that express conservation laws between pairs of related quantities. We presented several ways of quantifying the extent to which conservation laws hold using various confidence measures, and gave efficient approximation algorithms for the tableau discovery problem, i.e., finding subsets that satisfy (or fail) a supplied conservation dependency given some confidence threshold. Using real data sets, we demonstrated order-of-magnitude performance improvements, and the utility of tableau discovery for conservation dependencies in the context of data mining and data quality analysis. The reported tableaux are concise, easy to understand, and suggest interesting subsets of the data for further analysis.

This paper dealt with tableau discovery in the off-line model, where the data are available beforehand. An interesting direction for future work is to study on-line tableau discovery, where we incrementally maintain a compact tableau over a given conservation dependency as new data arrive.

APPENDIX

A Worked Examples of Calculating the Confidence of Conservation Dependencies

We now give worked examples based on FIG. 4, of calculating the confidence in different models, including those supported by the interval finding algorithm from [8].

Suppose that the interval in question is [3, 8] (technically, [3, 9)), as illustrated in FIG. 4. The area under the cumulative bills curve within this interval is 29+42+48+54+59+68=300. The area under the cumulative payments curve in this interval is 19+27+34+38+41+61=220. Note that the baseline, i.e., the cumulative payments just before the start of the interval, is 13. Thus, the area under the baseline in this interval is 6*13=78.

Now, con $f^b$ is the area between the cumulative payments and the baseline divided by the area between the cumulative bills and the baseline. This works out to $$\frac{220 - 78}{300 - 78} = 0.64.$$

To compute con $f^c$, we need to shift the cumulative payment curve up by seven, as illustrated on the left of FIG. 4. This increases the area between cumulative payments and the baseline by 7*6=42. Thus, we need to add 42 to the numerator that we used for con $f^b$, while keeping the same denominator. This gives $$conf^c = \frac{220 - 78 + 42}{300 - 78} = \frac{184}{222} = 0.83.$$

To compute con $f^d$, we shift the cumulative bills curve down by seven, as shown on the right of FIG. 4. This decreases the area between cumulative bills and the baseline by 7*6=42, so we subtract 42 from the denominator that we used for con $f^b$, while keeping the same numerator. We get $$conf^d = \frac{220 - 78}{300 - 78 - 42} = \frac{142}{180} = 0.79.$$

Now, we consider the two related confidence metrics that the interval-finding algorithm from [8] can compute (recall Section 2). The first metric simply adds up the individual bills and payments within the given interval. The total payments in the interval [3, 8] are 6+8+7+4+3+20=48 and the total bills are 11+13+6+6+5+9=50. The resulting confidence is $$\frac{48}{50} = 0.96.$$

As already mentioned, this confidence metric does not account for delays. In our example, this gives a higher confidence than all of our three models because it does not capture the fact that a large payment of 20 was made at the end of the interval to cover several outstanding bills. The second possible metric divides the area under the cumulative payment curve by the area under the cumulative bills curve (without the notion of a baseline). This gives $$\frac{200}{300} = 0.73,$$

which is higher than our con $f^b$. As already mentioned, if we do not take baselines into account, we overestimate the confidence of intervals that do not start at 1; the later the starting point, the more severe the overestimate.

B Tableau Discovery with Multiple Pairs of Sequences

In Sections 3 and 4, we addressed the tableau discovery problem for conservation dependencies on a single pair of sequences. We now discuss the case in which many pairs of sequences are given in the input. In the credit card example, there may be millions of users for whom we have separate charge and payment time series; in the network traffic example, a different pair of incoming and outgoing traffic measurements may be given for each router. As before, the objective will be to generate a minimal tableau that covers some fraction of the data, using subsets that all exceed (in case of a hold tableau) or fall below (in case of a fail tableau) a confidence threshold.

With a single pair of sequences, the only subsets (patterns) that were allowed in the tableaux were intervals on the ordered attribute. We now extend the allowed pattern space so that we can represent intervals in semantically meaningful clusters of pairs of sequences. We assume that each pair of sequences in the input is associated with a set L of label attributes, e.g., age group, gender and marital status for credit card customers, or router name, location and type for network monitoring. With each pair of sequences, we associate a descriptor tuple P, with a schema consisting of the set of label attributes L. Let P[k] be the projection of P onto the attribute k.

Definition 8 A tableau pattern p is a tuple of size [L]+1 with a schema consisting of the label attributes and the ordered attribute t, such as time. For each label attribute $k \in L$, the value taken on by p, call it p[k], is a constant from the domain of k or a special symbol "*". For the ordered attribute, p[t] may be an arbitrary interval.

Definition 9 A tableau pattern p matches a descriptor tuple P if for all $k \in L$ such that $p[k] \neq *$, p[k]=P[k].

Thus, a tableau pattern p identifies an interval within one or more pairs of sequences that match p's labeling attributes. For example, two patterns consisting of L={Router type, Router name} and t=time interval were shown in Table 1. Note that the "*" symbol acts as a wildcard and matches all values of the given labeling attribute. Also, note that patterns may overlap.

Having defined the space of possible patterns, we now show how to compute the confidence of any such pattern. Observe that a pattern selects an interval from a cluster of pairs of sequences. Intuitively, we calculate the confidence (with respect to a conservation dependency) of such an interval by adding up all the corresponding cumulative sequences in the cluster, and transforming them into one new pair of "joint" cumulative sequences. Formally, for each pair of cumulative sequences $A^{(k)}$ and $B^{(k)}$, whose descriptor tuples match the given tableau pattern, we derive a pair of superposed sequences A and B, where $A_j := \Sigma_k A_j^{(k)}$ and $B_j := \Sigma_k B_j^{(k)}$. The confidence of the given pattern then corresponds to con $f^b$, con $f^c$ and con $f^d$ computed on A and B within the interval specified in the pattern. In other words, the resulting confidence is the "average" confidence over all the pairs of sequences (in the given interval) that match the given tableau pattern.

We are now ready to state the minimal tableau discovery problem for conservation dependencies when multiple pairs of sequences are provided in the input:

Definition 10 Let m be the number of pairs of sequences, each of length n, believed to obey a conservation law. Let ŝ and ĉ be user-supplied support and confidence thresholds, respectively. The minimal tableau discovery problem is to find the fewest patterns of the form described above, whose union has size at least ŝmn, such that the confidence of each pattern is above (hold tableau) or below (fail tableau) ĉ, with confidence as defined above.

An exhaustive algorithm for computing a minimal tableau in this situation is to examine all $\Theta(n^2)$ intervals for each possible pattern on the label set L (i.e., each possible combination of wildcards and constants), and then run a greedy partial set cover algorithm using all the candidate intervals as input. We can reduce the number of intervals to examine by re-using the algorithms proposed in Section 4. Furthermore, we can combine our algorithms with the on-demand tableau discovery algorithm for conditional functional dependencies (CFDs) that was proposed in [10]. The idea is to examine the most general patterns on the label attributes, starting with all-stars, and try more specific patterns (by replacing one "*" at a time with a constant) only when the general pattern does not satisfy the confidence requirement.

C Algorithm for Generating Intervals for Hold Tableaux

```
Input:   a = <a_1,a_2,...,a_n>, b = <b_1,b_2,...,b_n> and ĉ
Output:  set of candidate intervals C
C := ∅;
A_0 := 0; B_0 := 0;
for i from 1 to n do
    A_i := A_{i-1} + a_i; B_i := B_{i-1} + b_i;
for i from n down to 1 do
    compute H_i^A and H_i^B depending on model;
l_max := ⌈log_{1+ε} area_B(1,n)⌉;
initialize r_1,r_2,...,r_{l_max} to 1;
for each i from 1 to n do
    j_max := 0;
    for each l from 1 to l_max do
        while area_B(i,r_l + 1) ≤ (1 + ε)^l do
            r_l++;
            if r_l ≥ n then
                break;
        if area_B(i,r_l) = 0 then
            conf(i,r_l) := 1;
        else
            conf(i,r_l) := area_A(i,r_l)/area_B(i,r_l);
        if conf(i,r_l) ≥ ĉ/(1 + ε)
            then j_max := r_l;
    if j_max > 0 then
        C := C ∪ {[i,j_max]};
```

D Proof of Theorem 7

We now give the proof of Theorem 1, which states that the running time of our hold tableau interval selection algorithm, for the balance, credit and debit models, is $O(n \log_{1+\epsilon} area_B(1, n))$, which is $O(n \lg area_B(1, n))$ if $\epsilon \leq 1$.

First, note that computing $area_A(i, j)$, $area_B(i, j)$, and con $f(i, j)$ are constant-time operations, since we can precompute $S_j = \Sigma_{l=1}^j A_l$ and $T_j = \Sigma_{l=1}^j B_l$. Then:

$$area_A(i, j) = (S_j - S_{i-1}) - (j-i+1)H_i^A,$$

$$area_B(i, j) = (T_j - T_{i-1}) - (j-i+1)H_i^B, \text{ and}$$

$$con f(i, j) = area_A(i, j)/area_B(i, j).$$

Now, the only remaining issue is how to compute the $r_{il}$'s quickly. For this, we need to make an assumption regarding the $H_i^A$'s and $H_i^B$'s.

Lemma 7 Suppose $r_{i-1,l} \leq r_{il}$ for all i, l. Then the total time to compute all $r_{il}$'s is $O(n \log_{1+\epsilon} area_B(1, n))$.

Proof. A candidate integer x equals $r_{il}$ if and only if $area_B(i, x) \leq (1+\epsilon)^l$ and $area_B(i, x+1) > (1+\epsilon)^l$ (or x=n).

We show how, given $l \leq \lceil \log_{1+\epsilon} area_B(1, n) \rceil$, to compute all n values $r_{1l}, r_{2l}, r_{3l}, \ldots, r_{nl}$ in a total of O(n) time. (Hence the total running time, over all values of l, will be $O(n \log_{1+\epsilon} area_B(1, n))$.)

We start with x=1 and increment x until $r_{1l} = x$ is found. When it is, we try to find $r_{2l}$, starting with $x = r_{1l}$ (which is safe because $r_{1l} \leq r_{2l}$), in each step testing x and incrementing x, until $r_{2l}$ is found. Once it is, we try to find $r_{3l}$, starting with $x = r_{2l}$ (which is safe because $r_{2l} \leq r_{3l}$), in each step testing x and incrementing x, until $r_{3l}$ is found. We continue in this way, starting the search for $r_{i+1,l}$ at the value $r_{il}$ just found. We continue in this way until $r_{nl}$ is found.

The key point is that x is never decreased. The number of times x is increased cannot exceed n, and in iterations in which x is not increased, we change from seeking $r_{i,l}$ to seeking $r_{i+1,i}$; this can happen at most n times, making for a total of at most 2n iterations. ∎

Lemma 8 If $H_i^B \geq H_{i-1}^B$ for all i, then $r_{i-1,l} \leq r_{i,l}$ for all i, l.

Proof. In general, $r_{i,l}$ is the maximum j such that $\Sigma_{l=i}^j (B_l - H_i^B) \leq (1+\epsilon)^l$ and $r_{i-1,l}$ is the maximum j such that $\Sigma_{l=i-1}^j (B_l - HP_{i-1}^B) \leq (1+\epsilon)^l$. Hence $\Sigma_{l=i}^{r_{i-1,l}} (B_l - H_{i-1}^B) \leq (1+\epsilon)^l$. If $H_i^B \geq H_{i-1}^B$, then $\Sigma_{l=i}^{r_{i-1,l}} (B_l - H_i^B) \leq (1+\epsilon)^l$, from which it follows that $r_{i,l} \geq r_{i-1,l}$. ∎

Lemma 9 For the balance, credit, and debit models, $H_i^B \geq H_{i-1}^B$.

Proof. For the balance and credit models, since $H_i^B = A_{i-1}$, we need simply show that $A_{i-1} \geq A_{i-2}$, which is obvious since A is nondecreasing. For the debit model, $H_i^B = A_{i-1} + \min_{k \geq i} \{B_k - A_k\}$. From the fact that $A_{i-2} \leq A_{i-1}$ and $\min_{k \geq i-1} \{B_k - A_k\} \leq \min_{k \geq i} \{B_k - A_k\}$, we infer that $H_{i-1}^B \leq H_i^B$. ∎

Theorem 1 now follows immediately from Lemmas 7, 8, and 9.

E Proof of Theorem 8

Next, we prove Theorem 2, which guarantees that our hold tableaux interval selection algorithm (1) returns no false positives, and (2) returns no false negatives.

The first part is trivial, as it is obvious from the algorithm that if the output includes an interval [i, j], then con $f(i, j) \geq \hat{c}/(1+\epsilon)$. Modulo the distinction between $\hat{c}$ and $\hat{c}/(1+\epsilon)$, there are no "false positives."

For the second part, define h such that $(1+\epsilon)^{h-1} < \text{area}_B(i, j^*) \leq (1+\epsilon)^h$. Since $r_{ih}$ is the largest index j such that $\text{area}_B(i, j) \leq (1+\epsilon)^h$, and $\text{area}_B(i, j^*) \leq (1+\epsilon)^h$, it follows that $r_{ih} \geq j^*$. The algorithm did compute the confidence of interval [i, $r_{ih}$]. We now prove that con $f(i, r_{ih}) \geq \hat{c}/(1+\epsilon)$, and hence the algorithm will report interval [i, $r_{ih}$] (or a longer interval, also of confidence at least $\hat{c}/(1+\epsilon)$).

$$conf(i, r_{ih}) = \frac{\text{area}_A(i, r_{ih})}{\text{area}_B(i, r_{ih})} \geq \frac{\text{area}_A(i, j^*)}{\text{area}_B(i, r_{ih})}.$$

Now $\text{area}_B(i, r_{ih}) \leq (1+\epsilon)^h$ and $\text{area}_B(i, j^*) > (1+\epsilon)^{h-1}$. Therefore $\text{area}_B(i, r_{ih})/\text{area}_B(i, j^*) < 1+\epsilon$. It follows that $$conf(i, r_{ih}) \geq \frac{\text{area}_A(i, j^*)}{(1+\epsilon)\text{area}_B(i, j^*)} = \frac{1}{1+\epsilon} conf(i, j^*) \geq \frac{1}{1+\epsilon} \hat{c}. \blacksquare$$

F Algorithm for Generating Intervals for Fail Tableaux

```
Input:   a = <a₁,a₂,...,aₙ>, b = <b₁,b₂,...,bₙ> and ĉ
Output:  set of candidate intervals C
C := ∅;
A₀ := 0; B₀ := 0;
for i from 1 to n do
    Aᵢ := Aᵢ₋₁ + aᵢ; Bᵢ := Bᵢ₋₁ + bᵢ;
for i from n down to 1 do
    compute Hᵢᴬ and Hᵢᴮ depending on model;
l_max := ⌈log₁₊ε area_A(1,n)⌉;
initialize r₁,r₂,...,r_{l_max} to 1;
for each i from 1 to n do
    j_max := 0;
    for each l from 1 to l_max do
        while area_A(i,r_l + 1) ≤ (1+ε)^l do
            r_l++;
            if r_l ≥ n then
                break;
        if area_B(i,r_l) = 0 then
            conf(i,r_l) := 1;
        else
            conf(i,r_l) := area_A(i,r_l)/area_B(i,r_l);
        if conf(i,r_l) ≤ ĉ(1 + ε)
            then j_max := r_l;
    if j_max > 0 then
        C := C ∪ {[i,j_max]};
```

G Proof of Theorem 9

Here, we prove Theorem 3, which guarantees that our fail tableau interval selection algorithm for the balance and debit models (1) returns no false positives, and (2) returns no false negatives.

The first part is trivial, as it is obvious from the algorithm that if the output includes an interval [i, j], then con $f(i, j) \leq \hat{c}(1+\epsilon)$.

For the second part, define h such that $(1+\epsilon)^{h-1} < \text{area}_A(i, j^*) \leq (1+\epsilon)^h$. Since $s_{ih}$ is the largest index j such that $\text{area}_A(i, j) \leq (1+\epsilon)^h$, and $\text{area}_A(i, j^*) \leq (1+\epsilon)^h$, it follows that $s_{ih} \geq j^*$. The algorithm did compute the confidence of interval [i, $s_{ih}$]. We now prove that con $f(i, s_{ih}) \leq \hat{c}(1+\epsilon)$, and hence the algorithm will report interval [i, $s_{ih}$] (or a longer interval, also of confidence at most $\hat{c}(1+\epsilon)$).

$$conf(i, s_{ih}) = \frac{\text{area}_A(i, s_{ih})}{\text{area}_B(i, s_{ih})} \leq \frac{\text{area}_A(i, s_{ih})}{\text{area}_B(i, j^*)}.$$

Now $\text{area}_A(i, s_{ih}) \leq (1+\epsilon)^h$ and $\text{area}_A(i, j^*) > (1+\epsilon)^{h-1}$. Therefore $\text{area}_A(i, s_{ih})/\text{area}_A(i, j^*) < 1+\epsilon$. It follows that $$conf(i, s_{ih}) \leq \frac{(1+\epsilon)\text{area}_A(i, j^*)}{\text{area}_B(i, j^*)} = (1+\epsilon) con\, f(i, j^*) \leq (1+\epsilon)\hat{c}. \blacksquare$$

H Proof of Theorem 11

Next, we prove Theorem 5, which applies to the fail tableau interval selection algorithm. First we prove that $s_{i-1,l} \leq s_{i,l}$ for all i, l; then we prove that the overall running time is $O(n \log_{1+\epsilon} \text{area}_A^c(1, n))$.

Because $s_{i,l}$ uses the balance model in its definition, that $s_{i-1,l} \leq s_{i,l}$ follows from the monotonicity of $H_i^A$ in the balance model.

It is obvious that the running time is $O(n \log_{1+\epsilon} \text{area}_A^b(1, n))$; what is not obvious is that the running time is $O(n \log_{1+\epsilon} \text{area}_A^c(1, n))$. Yet $$\text{area}_A^b(1, n) = \sum_{l=1}^{n} [A_l - A_{l-1}] \leq \sum_{l=1}^{n} \left[A_l - \left(A_{l-1} - \min_{k \geq i}\{B_k - A_k\}\right)\right] = \text{area}_A^c(1, n). \blacksquare$$

I Proof of Theorem 12

Finally, we prove Theorem 6, which guarantees that our fail tableau interval selection algorithm for the credit model (1) returns no false positives, and (2) returns no false negatives.

The first part is still trivial, as it is obvious from the algorithm that if the output includes an interval [i, j], then con $f^c(i, j) \leq \hat{c}(1+\epsilon)$.

For the second part, define h such that $(1+\epsilon)^{h-1} < \text{area}_A^b(i, j^*) \leq (1+\epsilon)^h$. Since $s_{ih}$ is the largest index j such that $\text{area}_A^b(i, j) \leq (1+\epsilon)^h$, and $\text{area}_A^b(i, j^*) \leq (1+\epsilon)^h$, it follows that $s_{ih} \geq j^*$. The algorithm did compute the confidence of interval [i, $s_{ih}$]. We now prove that con $f^c(i, s_{ih}) \leq \hat{c}(1+\epsilon)$, and hence the algorithm will report interval [i, $s_{ih}$] (or a longer interval, also of con $\hat{f}^c$-confidence at most $\hat{c}(1+\epsilon)$).

$$conf^c = \frac{\text{area}_A^c(i, s_{ih})}{\text{area}_B^c(i, s_{ih})}$$

$$= \frac{\text{area}_A^b(i, s_{ih}) + (s_{ih} - i + 1)\Delta_i}{\text{area}_B^c(i, s_{ih})} \text{ (where } \Delta_i = \min_{k \geq i} \{B_k - A_k\})$$

$$\leq \frac{\text{area}_A^b(i, s_{ih}) + (s_{ih} - i + 1)\Delta_i}{\text{area}_B^c(i, j^*)} \text{ (because } j^* \leq s_{ih}).$$

We now prove that $\text{area}_A^b(i, s_{ih}) \leq (1+\epsilon)\text{area}_A^b(i, j^*)$ and $s_{ih} - i + 1 \leq (1+\epsilon)(j^* - i + 1)$, which, as we will see, will complete the proof.

First, $\text{area}_A^b(i, s_{ih}) \leq (1+\epsilon)^h$ and $\text{area}_A^b(i, j^*) > (1+\epsilon)^{h-1}$. Therefore $\text{area}_A^b(i, s_{ih})/\text{area}_A^b(i, j^*) < 1+\epsilon$.

Second, because $A_l$ is nondecreasing in l, and $j^* \leq s_{ih}$, the average value of $A_l$ over the interval [i, $j^*$] is at most the average value of $A_l$ over the interval [i, $s_{ih}$]. Therefore $$\frac{\sum_{l=i}^{j^*} A_l}{j^* - i + 1} \leq \frac{\sum_{l=i}^{s_{ih}} A_l}{s_{ih} - i + 1}$$

and hence $$\frac{\sum_{l=i}^{j^*} [A_l - A_{i-1}]}{j^* - i + 1} \leq \frac{\sum_{l=i}^{s_{ih}} [A_l - A_{i-1}]}{s_{ih} - i + 1}.$$

From this, we have $$\frac{\text{area}_A^b(i, j^*)}{j^* - i + 1} \leq \frac{\text{area}_A^b(i, s_{ih})}{s_{ih} - i + 1},$$

so that $$\frac{s_{ih} - i + 1}{j^* - i + 1} \leq \frac{\text{area}_A^b(i, s_{ih})}{\text{area}_A^b(i, j^*)} < 1 + \epsilon.$$

It follows that $s_{ih} - i + 1 < (1+\epsilon)(j^* - i + 1)$.

The rest is smooth sailing. We have $$conf^c(i, s_{ih}) \leq \frac{(1+\epsilon)\text{area}_A^b(i, j^*) + [(1+\epsilon)(j^* - i + 1)]\Delta_i}{\text{area}_B^c(i, j^*)}$$

$$= \frac{(1+\epsilon)\text{area}_A^c(i, j^*)}{\text{area}_B^c(i, j^*)}$$

$$= (1+\epsilon)conf^c(i, j^*)$$

$$\leq (1+\epsilon)\hat{c}. \blacksquare$$

REFERENCES

[1] R. Agrawal, T. Imielinski, A. Swami: Mining Association Rules between Sets of Items in Large Databases. SIGMOD 1993: 207-216.

[2] L. Bravo, W. Fan, S. Ma: Extending Dependencies with Conditions. VLDB 2007: 243-254.

[3] S. Chaudhuri, A. Das Sarma, V. Ganti, R. Kaushik: Leveraging aggregate constraints for deduplication. SIGMOD 2007: 437-448.

[4] F. Chiang, R. Miller: Discovering data quality rules. PVLDB 1(1): 1166-1177 (2008).

[5] S. Flesca, F. Furfaro, F. Parisi: Consistent Query Answers on Numerical Databases Under Aggregate Constraints. DBPL 2005: 279-294.

[6] W. Fan, F. Geerts, X. Jia, A. Kementsietsidis: Conditional functional dependencies for capturing data inconsistencies. ACM Trans. Database Syst. 33(2): (2008).

[7] W. Fan, F. Geerts, L. Lakshmanan, M. Xiong: Discovering Conditional Functional Dependencies. ICDE 2009: 1231-1234.

[8] T. Fukuda, Y. Morimoto, S. Morishita, T. Tokuyama: Mining Optimized Association Rules for Numeric Attributes. PODS 1996: 182-191.

[9] L. Golab, T. Johnson, N. Koudas, D. Srivastava, D. Toman: Optimizing away joins on data streams. SSPS 2008: 48-57.

[10] L. Golab, H. Karloff, F. Korn, D. Srivastava, B. Yu: On generating near-optimal tableaux for conditional functional dependencies. PVLDB 1(1): 376-390 (2008).

[11] L. Golab, H. Karloff, F. Korn, A. Saha, D. Srivastava: Sequential Dependencies. PVLDB 2(1): 574-585 (2009).

[12] F. Korn, S. Muthukrishnan, Y. Zhu: Checks and Balances: Monitoring Data Quality Problems in Network Traffic Databases. VLDB 2003: 536-547.

[13] M. Slade: Dramatic slowdown in credit card debt. New Zealand Herald, 1 May 2009. www.nzherald.co.nz.

FIG. 7 shows a system 70 in which the present invention is illustratively implemented. The system includes a computer or workstation 71 having a hard disk or other non-transitory computer-readable storage medium 72 and a processor 73. Among the information stored in medium 72 is a database 711 containing data records and a body of software, denoted as tableau generating software 713. That software, more particularly, comprises machine-readable instructions that, when executed by processor 73, cause computer or workstation 71 to carry implement the invention. Computer or workstation 71 also includes other conventional elements (not shown) that those skilled in the art will recognize as being deemed desirable to implement the invention as described herein.

The foregoing merely illustrates the principles of the invention. For example, the invention is illustrated in the context of two data sequences $a = \{a_1, a_2, \ldots a_i, \ldots a_n\}$ and $b = \{b_1, b_2, \ldots b_i \ldots b_n\}$ for which the $i^{th}$ pair of values, $(a_i, b_i)$, is associated with the $i^{th}$ value, $t_i$, of an ordered attribute $t = \{t_1, t_2, \ldots t_i, \ldots t_n\}$. However, the principles of the invention can be extended to the contexts in which there are more than two data sequences, so long as the data in the two sequences can be transformed into two sequences that are expected to obey a conservation law. Such an application might be, for example, where one desires to analyze the entry/exit data of a building into which people enter through a main door, exit through that main door, and also may exit through an exit-only side door.

It will thus be appreciated that those skilled in the art will be able to devise various alternative implementations which, even if not shown or described herein, embody the principles of the invention and thus are within their spirit and scope.

The invention claimed is:

1. A computer-implemented method of processing a data set, wherein the data set comprises a pair of numerical sequences $a = \{a_1, a_2, \ldots a_i, \ldots a_n\}$ and $b = \{b_1, b_2, \ldots b_i \ldots b_n\}$ with $a_i, b_i \geq 0$ for all integer values of i, and for which the $i^{th}$ pair of values, $(a_i, b_i)$, is associated with the $i^{th}$ value, $t_i$, of an ordered attribute $t = \{t_1, t_2, \ldots t_i, \ldots t_n\}$, the method comprising:

generating, by a processor, a cumulative total by time t of the a of the pair of numerical sequences to a time T;

generating, by the processor, the cumulative total over the time t of the b of the pair of numerical sequences to the time T;

defining, by the processor, a tableau as subsets of the $i^{th}$ pair of values ($a_i$, $b_i$) having confidences;

determining, by the processor, the tableau as one of a hold tableau and a fail tableau, the hold tableau having all the confidences at least equal to a minimum value, and the fail tableau having all the confidences less than or equal to a maximum value;

generating, in storage, an electronic plot of the cumulative total over the time t of the a of the pair of numerical sequences;

generating, by the processor, a cumulative plot by plotting the cumulative total over the time t of the b of the pair of numerical sequences onto another plot of the cumulative total over the time t of the a of the pair of numerical sequences;

adding, by the processor, a baseline to the cumulative plot as the cumulative total over the time t of the a of the pair of numerical sequences, where $t = \{t_1, t_2, \ldots t_{n-1}\}$;

determining, by the processor, an area between plots of the cumulative total over the time t of the pair of the numerical sequences a and b;

determining, by the processor, a balance model using the area between the plots of the cumulative total over the time t of the pair of the numerical sequences a and b;

comparing, by the processor, the cumulative total over the time t of the a of the pair of numerical sequences to the cumulative total over the time t of the b of the pair of numerical sequences;

determining, by the processor, a conservation law in response to the comparing of the cumulative total over the time t of the a of the pair of numerical sequences to the cumulative total over the time t of the b of the pair of numerical sequences;

determining, by the processor, a smallest hold tableau having a smallest value of all the confidences that are at least equal to the minimum value; and defining, by the processor, a conservation dependency as the smallest hold tableau associated with the a of the pair of numerical sequences and the b of the pair of numerical sequences, thus satisfying the conservation law.

2. The method of claim 1, further comprising upwardly shifting the electronic plot of the cumulative total over the time t of the a of the pair of numerical sequences.

3. The method of claim 1, further comprising downwardly shifting the electronic plot of the cumulative total over the time t of the a of the pair of numerical sequences.

4. A memory storing instructions that when executed cause a processor to perform operations, the operations comprising:

generating a cumulative total by time t of a sequence a of a pair of numerical sequences, wherein the sequence a = $\{a_1, a_2, \ldots a_i, \ldots a_n\}$, with $a_i \geq 0$ for all integer values of i;

generating a corresponding cumulative total over the time t of a sequence b, wherein the numerical sequence b = $\{b_1, b_2, \ldots b_i \ldots b_n\}$ with $b_i \geq 0$ for the all integer values of i and for which the $i^{th}$ pair of values, ($a_i$, $b_i$), is associated with the $i^{th}$ value time $t_i$ of an ordered attribute t = $\{t_1, t_2, \ldots t_i, \ldots t_n\}$;

defining a tableau as subsets of the $i^{th}$ pair of values ($a_i$, $b_i$) having confidences;

determining the tableau as one of a hold tableau and a fail tableau, the hold tableau having all the confidences at least equal to a minimum value, and the fail tableau having all the confidences less than or equal to a maximum value;

generating an electronic plot of the cumulative total over the time t of the numerical sequence a;

plotting the corresponding cumulative total over the time t of the numerical sequence b onto the electronic plot of the cumulative total over the time t of the numerical sequence a;

comparing the cumulative total over the time t of the numerical sequence a to the cumulative total over the time t of the numerical sequence b;

determining a conservation law in response to the comparing of the cumulative total over the time t of the numerical sequence a to the cumulative total over the time t of the numerical sequence b;

determining a smallest hold tableau having a smallest value of all the confidences that are at least equal to the minimum value; and defining a conservation dependency as the smallest hold tableau associated with the a of the pair of numerical sequences and the b of the pair of numerical sequences, thus satisfying the conservation law.

* * * * *